United States Patent
Soules et al.

(10) Patent No.: US 6,452,324 B1
(45) Date of Patent: Sep. 17, 2002

(54) FLUORESCENT LAMP FOR GROCERY LIGHTING

(75) Inventors: Thomas F. Soules, Richmond Heights; Pak K. Yuet, Mayfield Heights, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/650,897

(22) Filed: Aug. 30, 2000

(51) Int. Cl.$^7$ .................................................. H01J 1/62
(52) U.S. Cl. ...................................... 313/486; 313/487
(58) Field of Search ................................. 313/486, 487, 313/485, 489; 252/301.4 P, 301.4 H, 301.6 P, 301.4 F, 301.4 R

(56) References Cited

U.S. PATENT DOCUMENTS

| | | | |
|---|---|---|---|
| 3,287,586 A | * 11/1966 | Bickford | 313/487 |
| 3,720,826 A | * 3/1973 | Gilmore et al. | 313/25 |
| 4,307,321 A | 12/1981 | Pappalardo et al. | |
| 4,357,559 A | 11/1982 | Piper | |
| 4,384,237 A | 5/1983 | Taubner et al. | |
| 4,403,171 A | 9/1983 | Nakano et al. | |
| 4,475,064 A | 10/1984 | Burgess | |
| 4,638,214 A | 1/1987 | Beers et al. | |
| 4,663,563 A | 5/1987 | Taya et al. | |
| 4,698,226 A | 10/1987 | Guthrie | |
| 4,733,126 A | 3/1988 | Yamakawa et al. | |
| 4,751,426 A | 6/1988 | Hoffman et al. | |
| 4,956,751 A | * 9/1990 | Kano | 362/1 |
| 5,049,779 A | 9/1991 | Itsuki et al. | |
| 5,113,118 A | 5/1992 | Sigai et al. | |
| 5,151,215 A | 9/1992 | Sigai | |
| 5,185,180 A | 2/1993 | Kasenga et al. | |
| 5,188,763 A | 2/1993 | Chenot et al. | |
| 5,223,341 A | 6/1993 | Sigai | |
| 5,256,096 A | 10/1993 | Lagos | |
| 5,289,081 A | 2/1994 | Tamatani et al. | |
| 5,350,971 A | 9/1994 | Jeong | |
| 5,358,734 A | 10/1994 | Lenox et al. | |
| 5,417,886 A | 5/1995 | Tateiwa et al. | |
| 5,441,774 A | 8/1995 | Dutta et al. | |
| 5,714,836 A | 2/1998 | Hunt et al. | |
| 5,731,659 A | 3/1998 | Soules et al. | |
| 5,768,898 A | 6/1998 | Seok et al. | |
| 5,779,347 A | 7/1998 | Seok | |
| 5,838,100 A | 11/1998 | Jansma | |
| 5,838,116 A | 11/1998 | Katyl et al. | |
| 5,917,291 A | 6/1999 | Soules et al. | |

* cited by examiner

*Primary Examiner*—Vip Patel
*Assistant Examiner*—Joseph Williams
(74) *Attorney, Agent, or Firm*—Pearne & Gordon LLP

(57) ABSTRACT

A fluorescent lamp particularly adapted for illuminating food, such as in a grocery store, particularly meat. The phosphor-containing layer in the lamp has two phosphors, a broad-band red-emitting phosphor having a peak between 610 and 645 nm, and a broad-band blue-green-emitting phosphor having a peak between 465 and 495 nm. The preferred phosphors are $(Sr,Mg,Ca)_3(PO_4)_2:Sn^{2+}$ and $Ca_5(PO_4)_3F:Sb^{3+}$. The lamp also has substantially reduced UV radiation.

19 Claims, 1 Drawing Sheet

FLUORESCENT LAMP FOR GROCERY LIGHTING

FIELD OF THE INVENTION

The present invention relates to fluorescent lamps and more particularly to a fluorescent lamp adapted for illuminating food in grocery stores, meat markets, and other places where food, particularly meat, is displayed.

BACKGROUND OF THE INVENTION

There is currently a market for specialty fluorescent lamps for use in grocery stores, meat markets, other shops where food is displayed, etc. The lamps satisfying this market have reduced ultraviolet emission and typically have a large amount of radiation in the red region of the spectrum. The latter is provided by phosphors, such as magnesium fluorogermanate activated with manganese emitting in a narrow band near 650 nm and/or yttrium oxide activated with europium emitting in a narrow band at 611 nm. These phosphors have the disadvantage of being expensive. Further, while enhancing red colors, these lamps otherwise do not provide natural color rendition as measured by the CIE color rendition index.

There is a need for a fluorescent lamp which renders the color of foods more vivid and appealing than under typical halophosphate and tri-color lamps and which does so without giving an unnatural color appearance or a preponderance of red color.

There is also a need for a fluorescent lamp which achieves the desired customer color effects on foods without using rare or expensive phosphors. The two preferred phosphors used in the present invention, $(Sr,Mg,Ca)_3(PO_4)_2:Sn^{2+}$ (note that Mg and/or Ca can be zero) and $Ca_5(PO_4)_3F:Sb^{3+}$, are both common and less costly.

SUMMARY OF THE INVENTION

A mercury vapor discharge lamp comprising a glass envelope, means for providing a discharge, a discharge-sustaining fill of mercury and an inert gas sealed inside said envelope, and a phosphor-containing layer coated inside said glass envelope, said phosphor-containing layer containing not more than two phosphors, said phosphor-containing layer containing a blend of a first phosphor and a second phosphor, said first phosphor having an emission band with a maximum between 610 and 645 nm and having a width at half maximum of at least 50 nm, said second phosphor having an emission band with a maximum between 465 and 495 nm and having a width at half maximum of at least 50 nm.

DETAILED DESCRIPTION OF THE INVENTION

Figure 1:
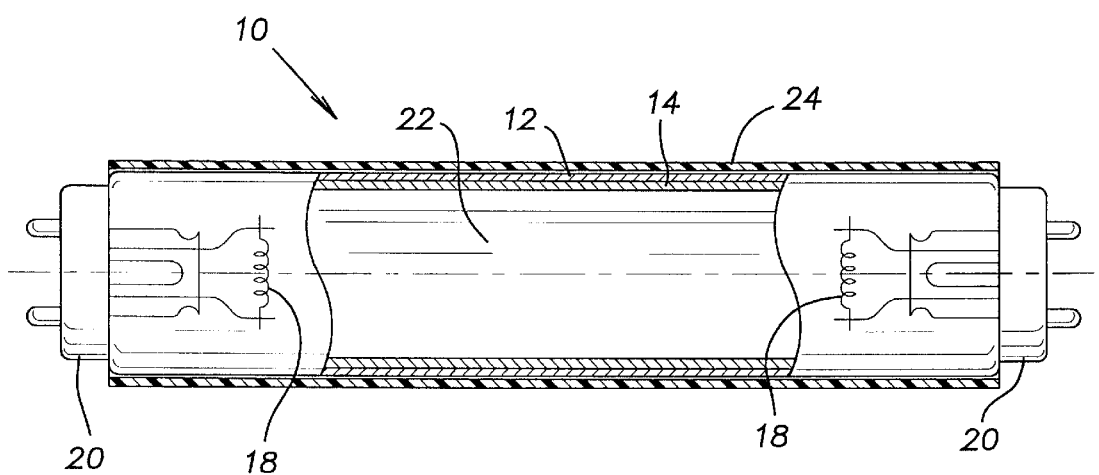
FIG. 1 shows diagrammatically, and partially in section, a fluorescent lamp according to the present invention.

As used herein, parts are parts by weight and percents are weight percents unless otherwise indicated or apparent. When a preferred range such as 5–25 is given, this means preferably at least 5 and, separately and independently, preferably not more than 25. Color temperatures are CCT.

FIG. 1 shows a representative low pressure mercury vapor discharge fluorescent lamp 10, which is generally well-known in the art. The fluorescent lamp 10 has a clear light-transmissive glass tube or envelope 12 which has a circular cross-section. The inner surface of the glass envelope is provided with a phosphor-containing layer 14 according to the present invention.

The lamp is hermetically sealed by bases 20 attached at both ends, and a pair of spaced electrode structures 18 (which are means for providing a discharge) are respectively mounted on the bases 20. A discharge-sustaining fill 22 of mercury and an inert gas is sealed inside the glass tube. The inert gas is typically argon or a mixture of argon and other noble gases at low pressure which, in combination with a small quantity of mercury, provide the low vapor pressure manner of operation.

The phosphor-containing layer 14 is preferably utilized in a low pressure mercury vapor discharge lamp. It may be used in fluorescent lamps having electrodes as is known in the art, as well as in electrodeless fluorescent lamps as are known in the art, where the means for providing a discharge is a structure which provides high frequency electromagnetic energy radiation.

Preferably the lamp is covered by a plastic (preferably polycarbonate) sleeve 24, which absorbs or otherwise prevents transmission of more than half or most or a substantial amount or substantially all ultraviolet radiation from the lamp 10, which radiation is believed to accelerate food spoilage. Such a sleeve 24 is known in the art (see U.S. Pat. Nos. 5,729,085 and 5,173,637, the contents of which are incorporated herein by reference) and is available from General Electric Company under the trademark Cov-R-Guard. Sleeve 24 also provides protection should the lamp fall or be broken such as while being installed above a food-containing freezer, etc.

The phosphor-containing layer 14 is generally well-known in the art. In this invention there is only one phosphor-containing layer. Layer 14 contains a blend of two, only two, and not more than two phosphors. The first phosphor is a broad-band red-emitting phosphor having an emission band with a peak or maximum between 610 and 645, more preferably 615 and 640, more preferably 625 and 635, nm, more preferably about 628 nm, and having a width at half maximum of a least 50, more preferably at least 70, more preferably at least 85, more preferably at least 100, more preferably at least 120, nm. The second phosphor is a broad-band blue-green-emitting phosphor having an emission band with a peak or maximum between 465 and 495, more preferably 470 and 490, more preferably 475 and 485, nm, more preferably about 480 nm, and having a width at half maximum of at least 50, more preferably at least 70, more preferably at least 85, more preferably at least 100, more preferably at least 120, nm. The red phosphor is preferably $(Sr,Mg,Ca)_3(PO_4)_2:Sn^{2+}$, more preferably $(Sr_x, Mg_y, Ca)_3(PO_4)_2:Sn_q^{2+}$ where $1>x>0.7$, $y<0.3$, $z<0.2$, $q<0.1$, and $x+y+z+q/3$ is approx. 1, less preferably $GdMgB_5O_{10}:Ce^{3+}, Mn^{2+}$ (CBM). The blue-green phosphor is preferably $Ca_5(PO_4)_3F:Sb^{3+}$, more preferably $Ca_{5-x}(PO_4)_3F:Sb_x^{3+}$ where $x<0.1$, less preferably $(Ba,Ca)_5(PO_4)_3Cl: Eu^{2+}$, less preferably $MgWO_4$ or $CaWO_4$. The red phosphor and blue-green phosphor are blended together so that the lamp has a color temperature (CCT) of preferably 2500–4200 K, more preferably 2600–3300 K, more preferably 2700–3000 K. The lamp has an $R_a$ of preferably 80–96, more preferably 84–94, more preferably 85–92, more preferably 87–90, and preferably at least 85, 86, 87, 88, 89 and/or 90. Layer 14 also preferably contains a small amount of alumina as is known in the art, such as 1–2 weight percent (based on the total weight of phosphor) alumina. Finely divided alumina serves as an adherence additive.

Characteristics of the preferred phosphors and of preferred blends are given in the table below. Under "Phosphors", "red" means $(Sr_{0.87}, Mg_{0.12})_3(PO_4)_2:Sn_{0.04}^{2+}$, and "bl-grn" means $Ca_{4.96}(PO_4)_3F:Sb_{0.04}^{3+}$. "App. Rel. wts." means the approximate relative weights of the two phosphors.

$R_a=90$, $R_9=70$, $R_{10}=87$, $R_{13}=94$, $R_{14}=95$, and lumens=1900. The lamp was installed in the meat department of a grocery store. A targeted group of individuals reported excellent color rendering of meat and other foods illuminated by these lamps compared to illumination by several standard halophosphate and tri-phosphor lamps.

| Color Temperature | Phosphors | Spectr Amt | App. Rel. wts. | x | y | Lumens 32 W T8 | $R_a$ | $R_9$ sat. red | $R_{10}$ sat. yel | $R_{13}$ flesh | $R_{14}$ veg. |
|---|---|---|---|---|---|---|---|---|---|---|---|
| 2190 K | red | 1 | | .492 | .394 | 1480 | 78 | 32 | 62 | 79 | 90 |
| 20000 K | bl-grn | 1 | | .22 | .291 | 1772 | 66 | −105 | 52 | 51 | 88 |
| 2600 K | red | | 0.83 | .442 | .367 | | 85 | 56 | 76 | 89 | 92 |
| | bl-grn | | 0.17 | | | | | | | | |
| 2700 K | red | 0.89 | 0.79 | .434 | .364 | | 87 | 61 | 78 | 90 | 92 |
| | bl-grn | 0.11 | 0.21 | | | | | | | | |
| 2800 K | red | | 0.77 | .426 | .361 | 1526 | 88 | 66.6 | 83.8 | 92.6 | 93.9 |
| | bl-grn | | 0.23 | | | | | | | | |
| 3000 K | red | 0.815 | 0.74 | .418 | .366 | 1540 | 91 | 73 | 87 | 95 | 94 |
| | bl-grn | 0.185 | 0.26 | | | | | | | | |
| 3300 K | red | | 0.66 | .397 | .349 | | 92 | 84 | 87 | 96 | 93 |
| | bl-grn | | 0.34 | | | | | | | | |
| 3500 K | red | 0.738 | 0.64 | .392 | .356 | 1560 | 94 | 88 | 91 | 97 | 95 |
| | bl-grn | 0.262 | 0.36 | | | | | | | | |
| 4000 K | red | 0.676 | 0.57 | .373 | .349 | 1580 | 95 | 96 | 93 | 97 | 95 |
| | bl-grn | 0.324 | 0.43 | | | | | | | | |

The lamps of the present invention preferably have an $R_a$, $R_g$, $R_{10}$, $R_{13}$ and $R_{14}$ value between any of the respective values given in the table and preferably have a color temperature and x and y values between any of the respective values given in the table. The two phosphors are preferably blended so that their weight percents of the phosphor blend are preferably between any of the respective values given in the table. For example, the phosphor blend is preferably 57–83, more preferably 64–79, more preferably 74–79, weight percent of the red phosphor and preferably 17–43, more preferably 21–36, more preferably 21–26, weight percent of the blue-green phosphor, although it is well-known that these weight percents can change due to variations from lot to lot, variation in the fineness of the grind or grain size of the particles, quality of the phosphor, or different phosphors being used.

In the invented lamp high color rendering of grocery items, meats, fish, produce, bread and other food items is achieved by using two broad band emissions, one in the red and one in the blue-green region. These two emissions are balanced to provide a spectrum with good color rendering for all colors. Green and orange emissions decrease the vivid colors of food, and so are reduced or avoided in this blend. The lamp color is targeted to be well below the blackbody locus, due to the absence of the green emission. The present invention has very good general color rendition, as measured by the CIE color rendition index. As a result, all colors are rendered more realistically, similar to the way they would be under incandescent or daylight sources. This illuminates the food without a perceived preponderance of red, which actually distorts colors and makes meat appear redder than it normally would.

The following Example further illustrates various aspects of the invention. A 40T12 fluorescent lamp was produced wherein the phosphor blend was 78 weight percent $(Sr_{0.87}, Mg_{0.12})_3(PO_4)_2:Sn_{0.04}^{2+}$ and 22 weight percent $Ca_{4.96}(PO_4)_3F:Sb_{0.04}^{3+}$ and layer 14 also contained 1.2 weight percent (based on the total weight of phosphor) alumina. The lamp had a color temperature of 2854 K, x=0.426, y=0.366, While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mercury vapor discharge lamp comprising a glass envelope, means for providing a discharge, a discharge-sustaining fill of mercury and an inert gas sealed inside said envelope, and a phosphor-containing layer coated inside said glass envelope, said phosphor-containing layer containing not more than two phosphors, said phosphor-containing layer containing a blend of a first phosphor and a second phosphor, said first phosphor having an emission band with a maximum between 610 and 645 nm and having a width at half maximum of at least 50 nm, said second phosphor having an emission band with a maximum between 465 and 495 and having a width at half maximum of at least 50 nm, wherein said lamp has a color temperature of 2500–4200.

2. A lamp according to claim 1, wherein said first phosphor has an emission band with a maximum between 615 and 640 nm and said second phosphor has an emission band with a maximum between 470 and 490 nm.

3. A lamp according to claim 1, wherein said first phosphor has an emission band with a maximum between 625 and 635 nm and said second phosphor has an emission band with a maximum between 475 and 485 nm.

4. A lamp according to claim 1, wherein said first phosphor is $(Sr,Mg,Ca)_3(PO_4)_2:Sn^{2+}$ and said second phosphor is $Ca_5(PO_4)_3F:Sb^{3+}$.

5. A lamp according to claim 1, wherein said first phosphor is $(Sr_x,Mg_y,Ca_z)_3(PO_4)_2:Sn_q^{2+}$ where $1>x>0.7$, $y<0.3$, $z<0.2$, $q<0.1$, and $x+y+z+q/3$ is approx. 1 and said second phosphor is $Ca_{5-x}(PO_4)_3F:Sb_x^{3+}$ where $x<0.1$.

6. A lamp according to claim 1, wherein said first phosphor is selected from the group consisting of $(Sr,Mg,Ca)_3(PO_4)_2:Sn^{2+}$ and $GdMgB_5O_{10}:Ce^{3+},Mn^{2+}$ and wherein said second phosphor is selected from the group consisting of $Ca_5(PO_4)_3F:Sb^{3+}$, $(Ba,Ca)_5(PO_4)_3Cl:Eu^{2+}$, and $MgWO_4$.

7. A lamp according to claim 4, wherein said lamp has a color temperature of 2600–3300 K.

8. A lamp according to claim 4, wherein said lamp has an $R_a$ of 80–96.

9. A lamp according to claim 1, wherein said glass envelope is covered by a sleeve which prevents transmission of a substantial amount of the ultraviolet radiation of the lamp.

10. A lamp according to claim 4, wherein said glass envelope is covered by a plastic sleeve which prevents transmission of most of the ultraviolet radiation of the lamp.

11. A lamp according to claim 1, wherein said first phosphor and said second phosphor each have an emission band with a width at half maximum of at least 70 nm.

12. A lamp according to claim 1, wherein said first phosphor and said second phosphor each have an emission band with a width at half maximum of at least 100 nm.

13. A lamp according to claim 4, wherein said lamp has an $R_a$ of 84–94.

14. A method of illuminating meat comprising the step of illuminating said meat with a mercury vapor discharge lamp comprising a glass envelope, means for providing a discharge, a discharge-sustaining fill of mercury and an inert gas sealed inside said envelope, and a phosphor-containing layer coated inside said glass envelope, said phosphor-containing layer containing not more than two phosphors, said phosphor-containing layer containing a blend of a first phosphor and a second phosphor, said first phosphor having an emission band with a maximum between 610 and 645 nm and having a width at half maximum of at least 50 nm, said second phosphor having an emission band with a maximum between 465 and 495 nm and having a width at half maximum of at least 50 nm, wherein said lamp has a color temperature of 2500–4200 K.

15. A method according to claim 14, wherein said first phosphor has an emission band with a maximum between 615 and 640 m and said second phosphor has an mission band with a maximum between 470 and 490 nm.

16. A method according to claim 14, wherein said first phosphor is $(Sr_x,Mg_y,Ca_z)_3(PO_4)_2:Sn_q^{2+}$ where $1>x>0.7$, $y<0.3$, $z<0.2$, $q<0.1$, and $(x+y+z+q)/3$ is approx. 1 and said second phosphor is $Ca_{5-x}(PO_4)_3F:Sb_x^{3+}$ where $x<0.1$.

17. A method according to claim 14, wherein said first phosphor is selected from the group consisting of $(Sr,Mg,Ca)_3(PO_4)_2:Sn^{2+}$ and $GdMgB_5O_{10}:Ce^{3+}, Mn^{2+}$ and wherein said second phosphor is selected from the group consisting of $Ca_5(PO_4)_3F:Sb^{3+}$, $(Ba,Ca)_5(PO_4)_3Cl:Eu^{2+}$, and $MgWO_4$.

18. A method according to claim 14, where said lamp has an $R_a$ of 84–94.

19. A mercury vapor discharge lamp comprising a glass envelope, means for providing a discharge, a discharge-sustaining fill of mercury and an inert gas sealed inside said envelope, and a phosphor-containing layer coated inside said glass envelope, said phosphor-containing layer containing not more than two phosphors, said phosphor-containing layer containing a blend of a first phosphor and a second phosphor, said first phosphor having an emission band with a maximum between 610 and 645 nm and having a width at half maximum of at least 50 nm, said second phosphor having an emission band with a maximum between 465 and 495 and having a width at half maximum of at least 50 nm, wherein said lamp has a color temperature of 2500–4200, wherein said first phosphor is $(Sr_x,Mg_y,Ca_z)_3(PO_4)_2:Sn_q^{2+}$ where $1>x>0.7$, $y<0.3$, $z<0.2$, $q<0.1$, and $x+y+z+q/3$ is approx. 1 and said second phosphor is $Ca_{5-x}(PO_4)_3F:Sb_x^{3+}$ where $x<0.1$.

* * * * *